United States Patent [19]

Cunningham

[11] Patent Number: 4,679,805
[45] Date of Patent: Jul. 14, 1987

[54] SPACE SAVER CART

[76] Inventor: Michael J. Cunningham, 6004 5th Avenue, S.E., Calgary, Alberta, Canada, T2A 4E4

[21] Appl. No.: 895,215

[22] Filed: Aug. 11, 1986

[30] Foreign Application Priority Data

Sep. 17, 1985 [CA] Canada ................................ 490910

[51] Int. Cl.⁴ ............................................. B62B 3/00
[52] U.S. Cl. ............................ 280/33.99 R; 108/91; 211/149; 280/47.34; 280/79.3
[58] Field of Search .................. 280/33.99 S, 33.99 H, 280/33.99 R, 33.99 A, 33.99 T, 79.3, 79.1 A, 47.34, 47.35; 108/53.3, 91; 211/2, 149, 186, 195, 201

[56] References Cited

U.S. PATENT DOCUMENTS

| 2,928,681 | 3/1960 | Wilson | 280/79.3 |
| 3,224,787 | 12/1965 | Andersen | 280/33.99 R |
| 3,661,702 | 1/1975 | Wilson | 280/33.99 H |
| 3,669,464 | 6/1972 | Linzmeter | 280/47.34 |
| 3,827,376 | 8/1974 | Solomon | 108/91 |
| 4,052,081 | 10/1977 | Becker, III | 280/79.3 |

FOREIGN PATENT DOCUMENTS

| 525186 | 5/1956 | Canada . | |
| 985715 | 3/1976 | Canada | 280/79.3 |
| 1067535 | 12/1979 | Canada | 280/79.1 |
| 2326112 | 4/1977 | France | 280/33.99 H |

Primary Examiner—David M. Mitchell
Attorney, Agent, or Firm—Oblon, Fisher, Spivak, McClelland, & Maier

[57] ABSTRACT

Described herein is a movable cart of the "push" type, adapted to carry various items of hardware or building material such as lumber, carpentry materials, plumbing supplies, and the like. The cart comprises a base frame including a split level deck or platform member which consists of a rear deck member and a front deck member, the rear deck member being of slightly larger dimensions than, and positioned slightly above, the front deck member. Both front and rear deck members are rectangular, and may be (and preferably are) provided with decking. The base frame is provided with small wheels or casters, are rollably moving the cart. The cart also includes a pair of parallel upstanding members attached to the ends of the base frame and inclined slightly forwardly from the vertical, to the upper ends of which members is secured an open-ended tray member of rectangular outline, which projects forwardly a predetermined distance form the upstanding members and a connecting member joining their upper ends. The split level deck construction of the cart is such that when the front of a first cart of this type is pushed against the rear of a second cart of the same type the two carts will "nest" together by virtue of the front deck member of the first cart sliding beneath the rear deck member of the second cart, thus enabling the carts to be stored in a minimum of floor space when not in use.

12 Claims, 7 Drawing Figures

SPACE SAVER CART

The present invention relates generally to movable carts of the "push" type, and more particularly to movable carts of a type suitable to carry various items of hardware, and which are adapted to nest together so that two or more such carts will occupy a minimum of floor space.

Movable carts of various types are well known and have been extensively used; and likewise, various types of nestable or interlocking carts and carriages have been described in the art, and have found practical use, as for example in retail stores, supermarkets, and warehouses. For instance it is known to utilize carts in the food distribution industry which are foldable or collapsible in some manner, to save floor space.

An example of a known cart is described in Canadian Pat. No. 985,715 of Harold Isaacs, issued Mar. 16, 1976. This patent describes a self-supporting nesting cart which is free standing and has conventional running gear including swivel mounted wheels. In the Isaacs' cart, as described in Canadian Pat. No. 985,715, a pair of parallel main frame members extend vertically from a lower shelf and are supported by a horizontally extending main frame member connecting to and between the main frame members. A second shelf is located above the lower shelf and the horizontal support beam (see particularly FIG. 9). Both shelves are split and each half is hinged to their respective vertically extending main frame member. This arrangement and the spatial relationship of the running gear facilitates the nesting function wherein the cart is capable of being compactly fit into or within another cart of the same type (see FIG. 7).

In a somewhat similar manner, U.S. Pat. No. 3,861,702 to Wilson discloses a warehouse transport cart having a wheeled base from which four parallel uprights extend vertically. A pair of horizontal support beams 20 and 22 extend between each parallel pair of vertical uprights. The cart has a hinged bottom, the hinge running along the length of the cart such that the bottom shelf may be turned up when the cart is empty to permit the cart to be nested with similar carts when not in use to conserve space.

U.S. Pat. No. 2,928,681 (Wilson) describes a nestable wheeled tray carrying rack having a generally U-shaped bottom member.

Canadian Pat. No. 525,186 to Breitenbach discloses an adjustable and expansible all-purpose rack mounted on wheels.

U.S. Pat. No. 4,052,081 to Becker relates to a busing cart for use in restaurants, cafeterias or the like having S-shaped side frame members supporting conventional running gear and having variable shelf arrangements.

Canadian Pat. No. 1,067,535 to Romero relates to a store merchandising apparatus for storage and display of retail merchandise. This mobile merchandising cart is comprised of a U-shaped base means having a pair of substantially parallel upright posts and extending vertically from the base. The upright posts are supported by a tubular cross brace. A plurality of removable shelves may be suspended by a series of notches located along each upright post and allows for variable spacing of the shelves.

Many of the movable carts which have been previously known and used, while they are satisfactory for the storage or transportation in stores or warehouses of goods such as grocery items, and also may be stacked or nested together to conserve space, are not ideally suited for storage of a variety of hardware items which typically are in a great variety of shapes and sizes—from small items such as fasteners (nails, screws, bolts, nuts, etc.) to elongated sheets, bars and the like, for instance, 8′×4′ sheets of material. Furthermore, while movable carts are known which are generally adapted for the storage and/or transport of hardware items of the type referred to above, they are generally of a type or construction which is not adapted to being stored in a compact manner when not in use.

The present invention provides a mobile cart which is suitable for the storage and transport of a variety of miscellaneous hardware items, and at the same time is designed so as to interlock or "nest" so that two or more such carts will occupy a minimum of floor space when the carts are not in use.

According to the present invention there is provided a movable cart comprising:

(a) a base frame provided with means for rollably moving said cart, said base frame including a longitudinally extending beam member and two deck support members, each of generally rectangular outline, attached to said beam member and extending horizontally outwardly in mutually opposed directions from the points of attachment to said beam member, the first said member being positioned at a level slightly below that of the second said member;

(b) elongated support means vertically extending from and connected to said base frame; and (c) an open-ended rectangular tray member secured to and projecting outwardly from said vertically extending support means at its upper end, said tray member being parallel to and vertically spaced apart from said first deck support member of said base frame;

said cart being constructed and arranged such that when the first said cart is brought into juxtaposition with a second said cart the first deck support member of said base support means of said first cart will nest beneath the second deck support member of said second cart.

More particularly, the present invention provides a movable cart comprising:

(a) a base frame including a longitudinally extending beam member, said base frame also including a rear deck member of rectangular outline, said rear deck member being secured to one side of said longitudinally extending beam member, at the top thereof; and a generally rectangular front deck member secured to the opposite side of said beam member at the bottom thereof, and projecting outwardly a predetermined distance from said base frame member, said front deck member being of smaller dimensions than the rear deck member and being at a level slightly below that of said rear deck member;

(b) said base frame being provided with means for rollably moving said cart, secured to the outer corners of said rear deck member and front deck member;

(c) a pair of parallel elongated upstanding members secured to the ends of said base frame member; said upstanding members being inclined slightly forwardly from the vertical;

(d) a connecting member integrally joined to the upper ends of said upstanding members; and (e) an open-ended tray member of rectangular outline, secured to said connecting member along one side thereof, and projecting forwardly therefrom a predetermined distance, said tray member being parallel to and vertically spaced apart from said front deck member;

said cart being so constructed and arranged that when the front of a first such cart is brought into juxtaposition with the rear of a second said cart, the front deck member of said first cart will nest beneath the rear deck member of said second cart.

Preferably there is also included at least one set of forwardly projecting members, each member of said pair being attached to a respective one of said pair of parallel upstanding members, said set of projecting members being vertically spaced from, and parallel to, said tray member and said front deck member. These forwardly projecting members serve as support for additional shelves or trays which may be attached to or placed on the front of the cart.

For a better understanding of the invention, reference will now be made to the following description, when taken in conjunction with the accompanying drawings, in which.

Figure 1:
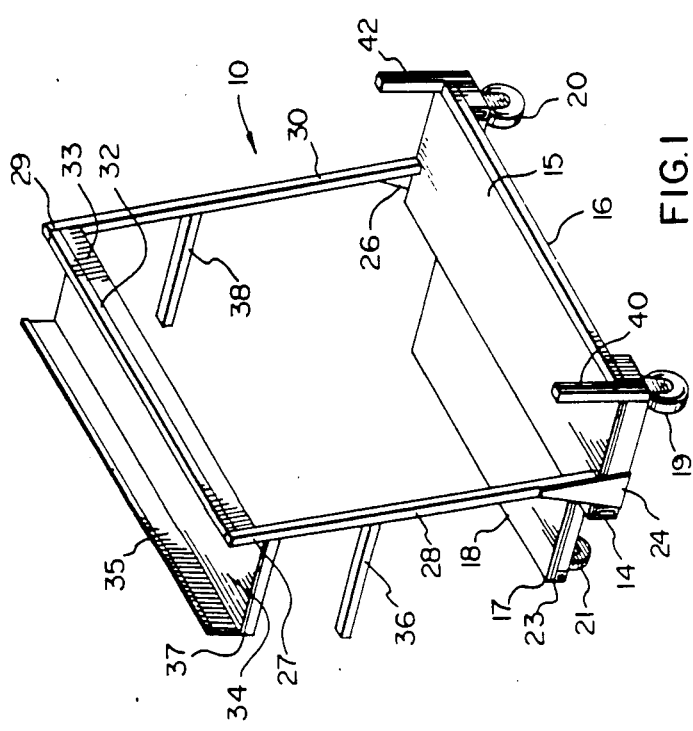
FIG. 1 is a perspective view of a cart according to the present invention.
Figure 3:
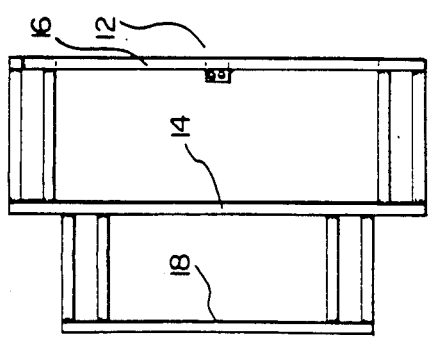
FIG. 3 is a plan view of the base portion of the cart.

Referring now to the drawings, there is shown a movable cart 10 of the "push" type which comprises a generally rectangular base frame 12 including a longitudinally extending beam member 14, and also including two members 16,18 each of generally rectangular outline, which are integrally attached to beam member 14 and extend horizontally outwardly therefrom in mutually opposed directions normal to the axis of beam member 14. Member 16, which may be considered as a rear deck member, is constructed such that it is positioned at a level slightly above front deck member 18, and is integrally attached to the top of beam member 14. Front deck member 18, which is attached to the bottom of beam member 14, is of smaller dimensions than rear deck member 16, as can be seen from FIGS. 1 and 3. Secured to the base frame 12 in any suitable manner, at the outer corners of rear deck member 16 and front deck member 18, are means for rollably moving the cart, such as omnidirectional swivel casters 19,20 and 21,22, respectively.

Figure 2:
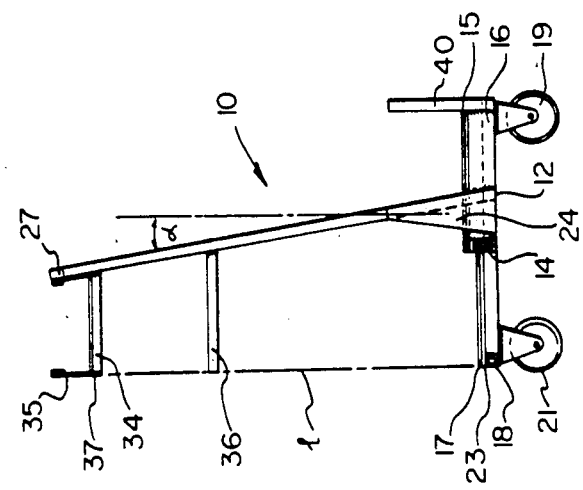
FIG. 2 is a side elevational view of the cart.

Secured to the ends of base frame 12 such as by attachment to bracket members 24,26, fixed to the ends of base frame member 12, are a pair of parallel, elongated upstanding members 28,30. Members 28,30 extend upwardly from the base frame member and also forwardly at a slight angle α from the vertical (see FIG. 2). A connecting member 32 (see FIG. 1) is integrally joined to the upper ends 27,29 of upstanding members 28,30, respectively. An open-ended tray member 34 of rectangular outline is secured to the forward side of connecting member 32 and projects forwardly therefrom. Tray member 34 includes an outer flange member 35 extending upwardly along its outer longitudinal edge, and also an inner flange member 33 integrally joined to connecting member 32 and to upstanding members 28,30. Tray member 34 is parallel to and vertically spaced apart from, front deck member 18, and is of such dimensions that its front longitudinal edge 37 is flush with the front longitudinal edge 23 of front deck member 18—that is, front longitudinal edge 37 of tray member 34 is on a line l extending vertically upwardly from edge 23 of front deck member 18 (see FIG. 2).

Cart 10 as illustrated also includes a pair of forwardly projecting members 36,38 attached, respectively, to upstanding members 28,30. Forwardly projecting members 36,38 are vertically spaced from and are parallel to, both front deck member 18 and tray member 34, and they extend outwardly, from their points of attachment to upstanding members 28,30, such that their ends are flush with edge 23 of front deck member 18 and edge 37 of tray member 34.

If desired, the cart may be provided with additional pairs of forwardly projecting members (not shown) similar to members 36,38, and in each case, being vertically spaced from and parallel to, front deck member 18 and tray member 34 and also members 36,38.

These forwardly projecting members can serve as shelf support members and also to support elongated items such as for example boards, laths, strips of material, etc.

The cart as illustrated further includes upstanding projections 40,42 secured to the corners of rear deck member 16. Rear deck member 16 is provided with a suitably dimensioned deck or platform 15, and likewise front deck member 18 is provided with a suitably dimensioned deck or platform 17. Upstanding projections 40, 42 assist in holding material carried by the rear deck, and to keep such material from sliding off the deck.

Cart 10 may be constructed of any suitable material, but a preferred material of construction is metal, e.g. steel. The decks or platforms 15,17 may also be constructed of any suitable material; however preferably they are of wood ¾" thick plywood is an especially preferred material for constructing platforms 15,17. The various component elements of the cart may be connected or joined together in any suitable manner. A preferred manner of connection, however, for the component elements of the cart (other than platforms 15,17) is by welding.

Figure 5:
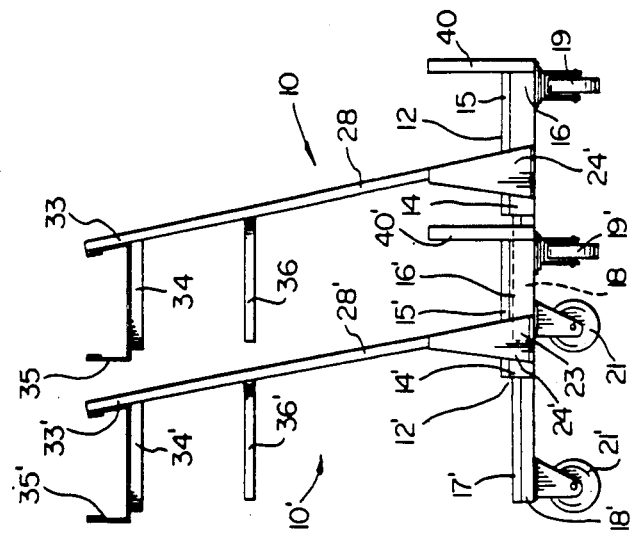
FIG. 5 is a side elevational view of two carts of the present invention in nesting or interlocking position.
Figure 4:
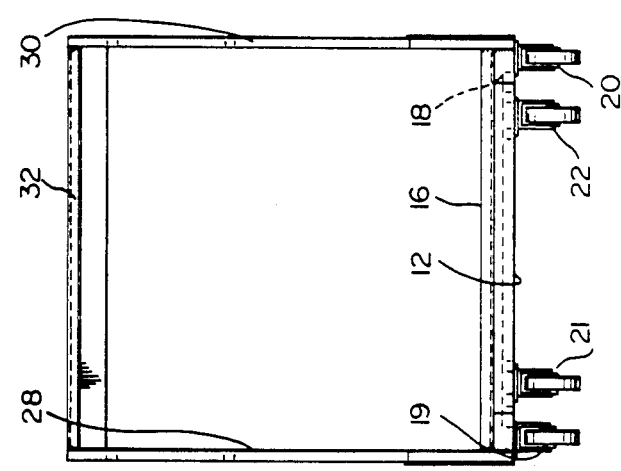
FIG. 4 is a front view of the cart.
Figure 7:
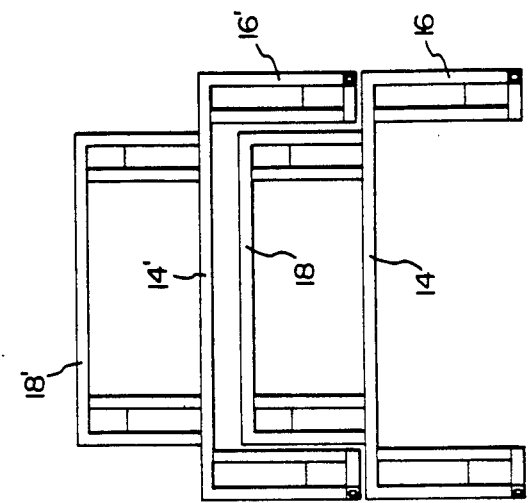
FIG. 7 is a plan view of the base portions of two carts of the present invention, in nesting position.
Figure 6:
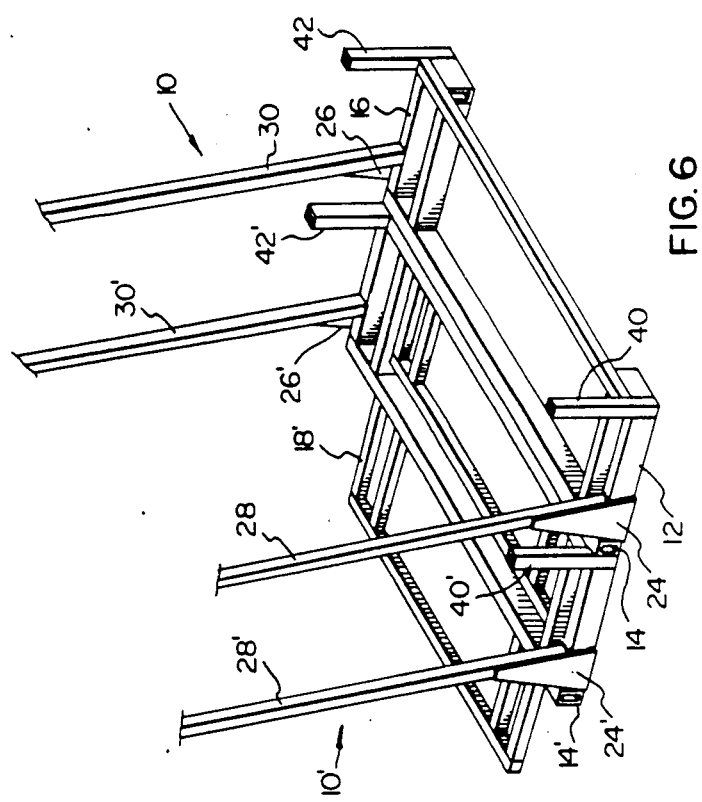
FIG. 6 is a perspective view of the base portions of two carts of the present invention when nested together, illustrating the nesting or interlocking arrangement.

A feature of the present invention is that, when the carts as described above are not in use for holding or transporting miscellaneous hardware items of varying shapes or sizes, they may be nested or interlocked together so as to save storage space. This feature will now be further described, with particular reference to FIGS. 5-7 of the drawings. Reference will be made herein to the "nesting" of two carts of this invention; however it is to be understood that any number of similar carts may be similarly nested together to conserve space.

The various parts of the interlocked carts are identified by the same reference numerals, except that for a second cart a given part is identified by a "prime", viz. the first cart is denoted 10, the second cart 10'; the first rear deck member is denoted 16, the second 16', and so on.

When it is desired to nest or interlock together two carts of the present invention, the forward part of cart 10 is pushed into contact with the rearward part of similar cart 10'. As previously mentioned, front deck member 18 is at a level slightly below rear deck member 16 and is of smaller dimensions than the rear deck member, and similarly, front deck member 18 of the first cart is positioned slightly below rear deck member 16 of the second cart and is of smaller dimensions than said rear deck member 16'. Consequently, when first cart 10 is pushed forwardly into contact with the rear of a second similar cart 10', front deck member 18 of the first cart, will slide beneath rear deck member 16' of second cart 10' until the front edge 23 thereof abuts beam member 14' of base frame 12' of the second cart, at which point the carts are in the nested or interlocked position. Since upstanding members 28,30 and 28',30' of the first and second carts, respectively, are inclined forwardly at a slight angle $\alpha$ from the vertical, there is still some clearance between outer flange member 35 of tray member 34 of the first cart and inner flange member 33' and connecting member 29' of the second cart 10', when the two carts are in the interlocked position; and likewise, there is some clearance between the forward ends of projecting members 36,38 of the first cart 10 and upstanding members 28',30' of the second cart when the two carts are nested together. Thus forwardly extending tray member 34 and projecting members 36,38 of the first cart 10 do not interfere with the nesting together of the two carts.

In a preferred embodiment of the invention the cart has the following approximate dimensions:

deck area: length 24", width 36"
Height of cart: 39⅝"

The cart is constructed with a split level deck, as will be apparent from the preceding description and from the drawings. The longitudinal beam member 14 joining the rear deck to the front deck is 1"×2".

The rear deck is constructed on the top of beam 14, and has outside dimensions of 36"×13", with an inside clearance of 28"×11". This rear deck is 1" higher than the front deck. The front deck is built on the bottom of the common beam 14, which allows for the 1" difference in height. The outside dimensions of this deck is 26¾"×11". This construction allows the front deck of one cart (i.e. the first cart 10) to nest within the rear deck of the second cart 10', and so on. With a ¾" plywood floor on both decks (15,17) this would allow for a ¼" clearance between the bottom of the rear deck of the second cart 10" and the top of the front deck of the first cart 10. When the carts are nested together the floor space of each nested 24" cart is reduced by 11".

The movable carts of the present invention have numerous uses. In particular they are useful for transporting any of the following materials, or any combination thereof, inside and/or outside a building:

lumber and mouldings
carpentry materials and equipment
plumbing materials and equipment
electrical materials and equipment
flooring materials and equipment
roofing materials and equipment
cement materials and equipment
glass materials and equipment, etc.

The carts may be used either with or without the deck tops (decks or platforms 15, 17); however, preferably, for maximum useability, they are provided with such deck tops or platforms.

While a particular embodiment of the invention has been shown and described herein, it will be appreciated, and will be obvious to persons skilled in the art, that various changes and modifications may be made therein without departing from the invention. It is therefore intended that this invention not be limited only to what is specifically described and shown in the drawings, but only by the claims which follow.

The embodiments of the invention in which an exclusive property or privilege is claimed are defined as follows:

1. A movable cart comprising:
   (a) a base frame provided with means for rollably moving said cart, said base frame including a longitudinally extending beam member and two deck support members, each of generally rectangular outline, attached to said beam member and extending horizontally outwardly in mutually opposed directions from the points of attachment to said beam member, the first said member being positioned at a level slightly below that of the second said member;
   (b) elongated support means vertically extending from and connected to said base frame; and
   (c) an open-ended rectangular tray member secured to and projecting outwardly from said vertically extending support means at its upper end, said tray member being parallel to and vertically spaced apart from said first deck support member of said base frame;

said cart being constructed and arranged such that when the first said cart is brought into juxtaposition with a second said cart the first deck support member of said base support means of said first cart will nest beneath the second deck support member of said second cart.

2. A movable cart comprising:
   (a) a base frame including a longitudinally extending beam member, said base frame also including a rear deck member of rectangular outline, said rear deck member being secured to one side of said longitudinally extending beam member, at the top thereof; and a generally rectangular front deck member secured to the opposite side of said beam member at the bottom thereof, and projecting outwardly a predetermined distance from said base frame member, said front deck member being of smaller dimensions than the rear deck member and being at a level slightly below that of said rear deck member;
   (b) said base frame being provided with means for rollably moving said cart, secured to the outer corners of said rear deck member and front deck member;
   (c) a pair of parallel elongated upstanding members secured to the ends of said beam, member, said upstanding members being inclined slightly forwardly from the vertical;
   (d) a connecting member integrally joined to the upper ends of said upstanding members; and
   (e) an open-ended tray member of rectangular outline, secured to said connecting member along one side thereof, and projecting forwardly therefrom a predetermined distance, said tray member being parallel to and vertically spaced apart from said front deck member;

said cart being so constructed and arranged that when the front of a first such cart is brought into juxtaposition with the rear of a second said cart, the front deck member of said first cart will nest beneath the rear deck member of said second cart.

3. A movable cart according to claim 2 which includes at least one pair of forwardly projecting members, each member of said pair being attached to a respective one of said pair of parallel upstanding members, said set of projecting members being vertically spaced from, and parallel to, said tray member and said front deck member.

4. A movable cart according to claim 1 or claim 2 wherein said means for rollably moving said cart are swivel casters.

5. A movable cart according to claim 2 or claim 3 wherein said base frame includes upstanding projections at a corner of the rear portion thereof.

6. A movable cart according to claim 2 or claim 3 wherein the rear deck member has outside dimensions of 36"×13", and an inside clearance of 28"×11", the front deck member has outside dimensions of 26¾"×11", the rear deck member is 1" above the front deck member, and there is approximately ¼" clearance between the bottom of the rear deck member and the top of the front deck member.

7. A movable cart according to claim 2 or claim 3 wherein said pair of upstanding members are secured to the beam member by attachment to bracket means fixed to the ends of said beam member.

8. A movable cart according to claim 1 wherein the deck support members are each provided with a suitably dimensioned deck or platform.

9. A movable cart according to claim 2 wherein the front deck members and rear deck members are each provided with a suitably dimensioned deck or platform.

10. A movable cart according to claim 8 or claim 9 wherein the cart elements, apart from the decks or platforms, are constructed of metal, and said decks or platforms are constructed of wood.

11. A movable cart according to claim 8 or claim 9 wherein the cart elements, apart from the decks or platforms, are constructed of metal and said decks or platforms are of ¾" plywood, the front deck being 1" below said rear deck, and there being approximately ¼" clearance between the bottom of the rear deck and the top of the front deck.

12. A movable cart according to claim 2 wherein said front deck member and said open ended tray member are dimensioned such that the forward longitudinal edge of said tray member is vertically aligned with the forward longitudinal edge of said front deck member.

* * * * *